United States Patent
Park et al.

(10) Patent No.: US 12,524,988 B2
(45) Date of Patent: Jan. 13, 2026

(54) APPARATUS FOR JUDGING FORGERY WEBTOON CONTENTS USING EXTRACTING REGION AND METHOD THEREOF

(71) Applicant: BeyondTech Inc., Seoul (KR)

(72) Inventors: Gunyoung Park, Incheon (KR); Jae Cheng Lee, Seoul (KR); Injae Yoo, Seoul (KR); Woo Seob Lee, Incheon (KR)

(73) Assignee: BeyondTech Inc., Seoul (KR)

( * ) Notice: Subject to any disclaimer, the term of this patent is extended or adjusted under 35 U.S.C. 154(b) by 265 days.

(21) Appl. No.: 18/289,220

(22) PCT Filed: Dec. 22, 2022

(86) PCT No.: PCT/KR2022/021026
§ 371 (c)(1),
(2) Date: Nov. 1, 2023

(87) PCT Pub. No.: WO2024/117364
PCT Pub. Date: Jun. 6, 2024

(65) Prior Publication Data
US 2025/0104390 A1 Mar. 27, 2025

(30) Foreign Application Priority Data

Nov. 30, 2022 (KR) .......................... 10-2022-0164121
Dec. 21, 2022 (KR) .......................... 10-2022-0180514

(51) Int. Cl.
*G06V 10/74* (2022.01)
*G06T 5/20* (2006.01)
(Continued)

(52) U.S. Cl.
CPC .............. *G06V 10/761* (2022.01); *G06T 5/20* (2013.01); *G06T 7/11* (2017.01); *G06T 7/13* (2017.01);
(Continued)

(58) Field of Classification Search
CPC ...... G06V 10/761; G06V 10/44; G06V 10/30; G06V 10/74; G06V 10/774; G06V 20/00;
(Continued)

(56) References Cited

U.S. PATENT DOCUMENTS 11,509,791 B1 * 11/2022 Gopalakrishnan ..... G06V 30/40
11,748,756 B2 * 9/2023 Chen ................. G06Q 20/4016
705/44
(Continued)

FOREIGN PATENT DOCUMENTS

KR      10-1165359 B1      7/2012
KR      10-1744614 B1      6/2017
(Continued)

OTHER PUBLICATIONS

Lourembam et al, A robust image copy detection method using machine learning, Malaya Journal of Matematik, vol. S, No. 1, 23-30, 2021 (Year: 2021).*

(Continued)

*Primary Examiner* — Andrae S Allison
(74) *Attorney, Agent, or Firm* — Revolution IP, PLLC (57) ABSTRACT

An apparatus for judging forgery webtoon contents using extraction region, includes an original webtoon feature extraction unit that extracts the webtoon in cut units, divides the webtoon into a plurality of regions, and extracts feature information for each of a plurality of divided regions when original content is input; a query target webtoon feature extraction unit that extracts the webtoon in cut units, removes an unnecessary space or a text region, divides the
(Continued)

webtoon into a plurality of regions, extracts feature information for each of the plurality of divided regions, and selects the plurality of regions when query target content is input; and a determination unit that compares feature information of original data regions that match the selected plurality of query data regions to determine a similarity, and determines whether the query target content is forged and altered using a determination result.

8 Claims, 6 Drawing Sheets

(51) Int. Cl.
    *G06T 7/11*     (2017.01)
    *G06T 7/13*     (2017.01)
    *G06V 10/44*     (2022.01)

(52) U.S. Cl.
    CPC .... *G06V 10/44* (2022.01); *G06T 2207/20192* (2013.01)

(58) Field of Classification Search
    CPC ..... G06T 5/20; G06T 7/11; G06T 7/13; G06T 2207/20192; G06F 18/00
    See application file for complete search history.

(56) References Cited

U.S. PATENT DOCUMENTS

| | | | |
|---|---|---|---|
| 2008/0240492 A1* | 10/2008 | Ohira | G06V 30/19067 |
| | | | 382/100 |
| 2011/0122255 A1 | 5/2011 | Haritaoglu | |
| 2014/0044361 A1 | 2/2014 | Lee | |
| 2015/0310306 A1* | 10/2015 | Song | G06V 10/75 |
| | | | 382/159 |
| 2021/0224515 A1* | 7/2021 | Gordon | G06F 18/2321 |

FOREIGN PATENT DOCUMENTS

| | | | |
|---|---|---|---|
| KR | 10-1744614 | * | 9/2017 |
| KR | 10-2019-0035146 A | | 4/2019 |
| KR | 10-2019-0061383 A | | 6/2019 |
| KR | 10-2052535 B1 | | 1/2020 |
| KR | 10-2022-0154576 A | | 11/2022 |

OTHER PUBLICATIONS

International Search Report for PCT/KR2022/021026 mailed Aug. 28, 2023 from Korean Intellectual Property Office.

\* cited by examiner

APPARATUS FOR JUDGING FORGERY WEBTOON CONTENTS USING EXTRACTING REGION AND METHOD THEREOF

TECHNICAL FIELD

The present invention relates to an apparatus for judging forgery webtoon contents using extraction region and method thereof, and more particularly, to an apparatus for judging forgery webtoon contents after extracting a webtoon region from webtoon contents.

BACKGROUND

As various webtoon platforms increase in Korea and abroad, various webtoon contents are being created. However, webtoon contents, including paid webtoon contents, are illegally distributed, thereby resulting in great losses. In particular, it is feared that the scale of copyright infringement will further increase. Accordingly, the government and copyright protection organizations are making various efforts to eradicate illegal copying, such as revising the Copyright Act and reinforcing crackdowns on and punishment for illegally copied videos.

However, a conventional webtoon forgery and alteration determination technology determines whether illegally copied content is present by inserting a watermark into webtoon content. Therefore, when the original webtoon content is slightly modified and distributed, for example, if a part of the webtoon cut is cut or only part thereof is transformed, there is a problem in that it is difficult to determine whether the original content has been forged and altered.

Therefore, there is a demand for a technology capable of determining whether the original webtoon contents are forged and altered regardless of whether the original webtoon contents are modified by using filters and algorithms that extract regions and extract features.

The background technology of the present invention is disclosed in Korean Unexamined Patent Publication No. 10-2022-0154576 (published on Nov. 22, 2022).

SUMMARY OF INVENTION

Technical Problem

An object of the present invention is to provide an apparatus for judging forgery webtoon contents using extraction region and method thereof to judge forgery webtoon contents by dividing a region of webtoon content and extracting features.

Technical Solutions

According to an embodiment of the present invention for achieving such a technical problem, there is provided an apparatus for judging forgery webtoon contents using extraction region, the apparatus including an original webtoon feature extraction unit that extracts the webtoon in cut units, divides the webtoon into a plurality of regions, and extracts feature information for each of a plurality of divided regions when original content is input; a query target webtoon feature extraction unit that extracts the webtoon in cut units, removes an unnecessary space or a text region, divides the webtoon into a plurality of regions, extracts feature information for each of the plurality of divided regions, and selects the plurality of regions when query target content is input; and a determination unit that compares feature information of original data regions that match the selected plurality of query data regions to determine a similarity, and determines whether the query target content is forged and altered using a determination result.

The original webtoon feature extraction unit or the query target webtoon feature extraction unit may remove the unnecessary space or the text region from the webtoon extracted in cut units.

The original webtoon feature extraction unit or the query target webtoon feature extraction unit may cause an outline for the webtoon from which the unnecessary space or the text region is removed to be sharpened by using a sharpening filter, apply a binary filter to extract outline information, extract the outline using a Canny Edge Detector, and apply Threshold Binarization to extract feature information from the outline, and additionally apply a Speed Up Robust Feature (SURF) algorithm to extract feature information of the divided region at high speed.

The query target webtoon feature extraction unit may select five regions having the largest number of feature information in the divided plurality of regions.

The determination unit may determine that the query target content is forged and altered when there are three or more regions having a similarity of 80% or more to the original data region among the selected five feature information regions.

According to another embodiment of the present invention, there is provided a method for judging forgery webtoon contents using extraction region by using an apparatus for judging forgery webtoon contents, the method including a step of extracting the webtoon in cut units, dividing the webtoon into a plurality of regions, and extracting feature information for each of a plurality of divided regions when original content is input; a step of extracting the webtoon in cut units, removing an unnecessary space or a text region, dividing the webtoon into a plurality of regions, extracting feature information for each of the plurality of divided regions, and selecting the plurality of regions when query target content is input; and a step of comparing feature information of original data regions that match the selected plurality of query data regions to determine a similarity, and determining whether the query target content is forged and altered using a determination result.

Advantageous Effects

As described above, according to the present invention, it is possible to determine whether the webtoon contents are forged and altered by using the feature information of the webtoon contents using deep learning to improve the identification speed.

In addition, even in the case of forgery webtoon content in which the size or resolution of the screen is modified, there is an effect of accurately and quickly determining whether the webtoon contents are forged and altered.

BEST MODE FOR INVENTION

Then, with reference to the accompanying drawings, embodiments of the present invention will be described in detail so that those skilled in the art may easily practice the present invention. However, the present invention may be implemented in many different forms and is not limited to the embodiments described herein. In addition, in order to clearly explain the present invention in the drawings, parts irrelevant to the description are omitted, and similar reference numerals are attached to similar parts throughout the specification.

Throughout the specification, when a part is said to be "connected" to another part, it includes not only the case where it is "directly connected", but also the case where it is "electrically connected" with another element in between. In addition, when a certain component is said to "include", this means that it may further include other components without excluding other components unless otherwise stated.

Then, with reference to the accompanying drawings, embodiments of the present invention will be described in detail so that those skilled in the art may easily practice the present invention.

First, an apparatus for judging forgery webtoon contents according to an embodiment of the present invention will be described through FIG. 1.

Figure 1:
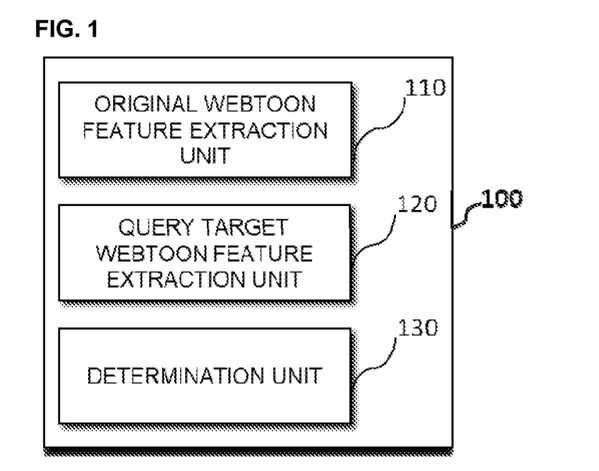
FIG. 1 is a block diagram of an apparatus for judging forgery webtoon contents using extraction region according to an embodiment of the present invention.

FIG. 1 is a block diagram of the apparatus for judging forgery webtoon contents using extraction region according to an embodiment of the present invention.

As illustrated in FIG. 1, an apparatus 100 for determining forgery webtoon contents according to an embodiment of the present invention includes an original webtoon feature extraction unit 110, a query target webtoon feature extraction unit 120, and a determination unit 130.

First, when the original webtoon content is input, the original webtoon feature extraction unit 110 extracts the original webtoon content in cut units, divides the extracted image in cut units into a plurality of regions, and extracts feature information for each of the divided regions.

Also, a cut refers to a frame surrounding a moment in a cartoon or a picture, and a speech bubble or sound effect is not included in the cut.

In addition, according to an embodiment of the present invention, webtoon feature information means an outline existing inside a webtoon content cut.

In addition, when the query target webtoon content is input, the query target webtoon feature extraction unit 120 extracts it in cut units, divides it into a plurality of regions, extracts feature information for each of the plurality of divided regions, and selects a plurality of regions.

The apparatus 100 for judging forgery webtoon contents may select a plurality of regions from the query target webtoon content extracted in cut units and compare them with the original webtoon content to quickly determine forgery and alteration.

Next, the determination unit 130 compares feature information of the original webtoon content that matches a plurality of regions selected from the query target webtoon to determine the similarity thereof, and determine whether the query target webtoon content is forged and altered according to the determination result.

Hereinafter, a method for extracting feature information of original webtoon content according to an embodiment of the present invention will be described with reference to FIGS. 2 to 3*b*.

Figure 2:
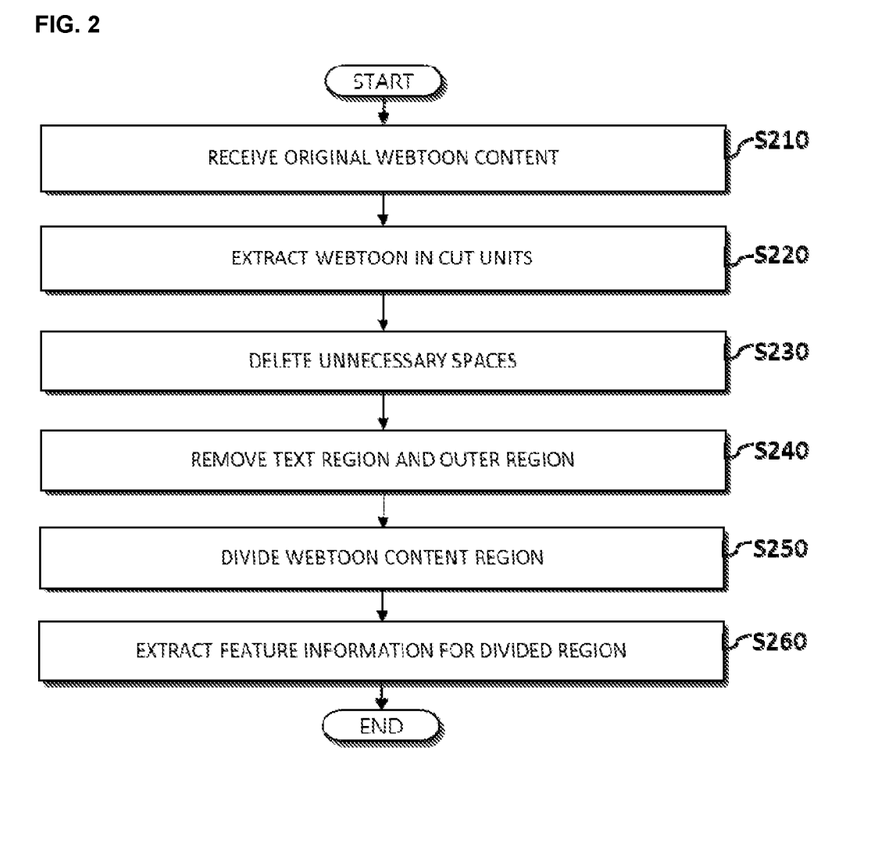
FIG. 2 is a flowchart for explaining a method for extracting feature information of original webtoon content according to an embodiment of the present invention.
Figure 3A:
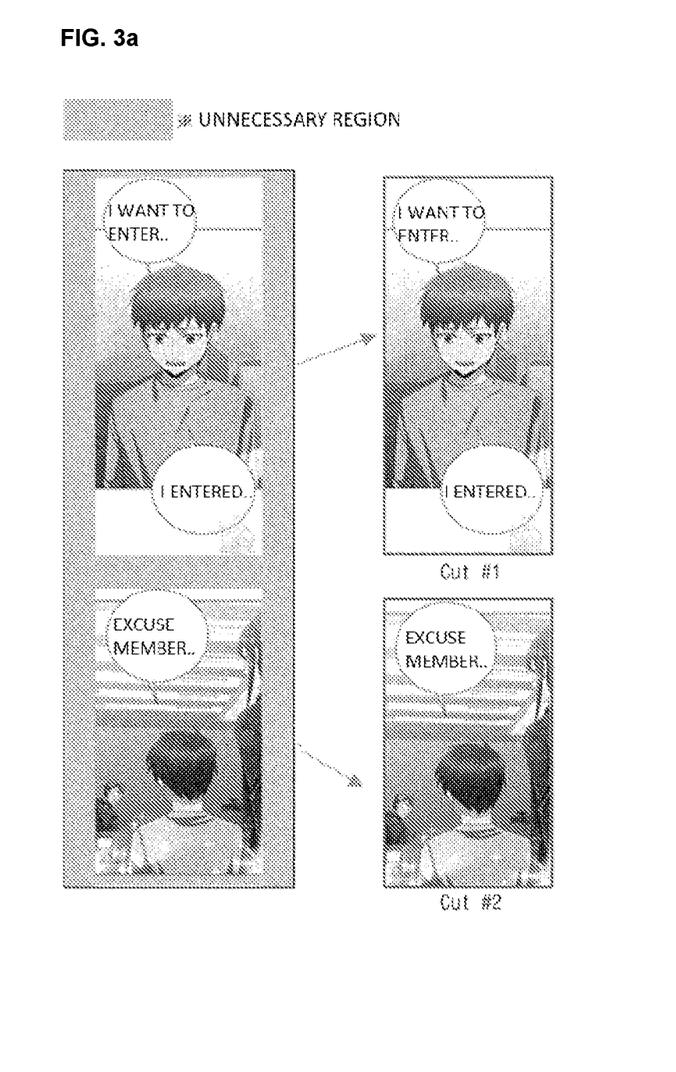
FIG. 3*a* is a view for explaining steps S220 and S230 of FIG. 2.
Figure 3B:
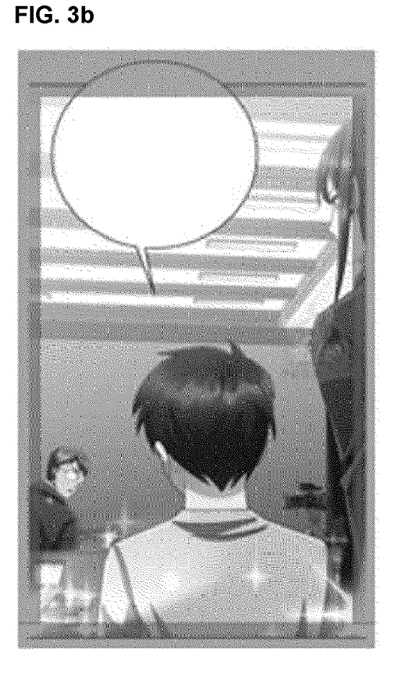
FIG. 3*b* is a view for explaining step S240 of FIG. 2.

FIG. 2 is a flowchart for explaining the method for extracting feature information of original webtoon content according to an embodiment of the present invention, FIG. 3*a* is a view for explaining steps S220 and S230 of FIG. 2, and FIG. 3*b* is a view for explaining step S240 of FIG. 2.

First, as illustrated in FIG. 2, the original webtoon feature extraction unit 110 receives the original webtoon content from a user (S210).

In addition, as illustrated in FIGS. 2 and 3*a*, the original webtoon feature extraction unit 110 extracts the original webtoon in cut units (S220).

The original webtoon feature extraction unit 110 extracts the original webtoon in cut units regardless of the size of the cut.

Next, as illustrated in FIGS. 2 and 3*a*, the original webtoon feature extraction unit 110 extracts and deletes the unnecessary spaces (S230).

In this case, the unnecessary space means a margin at an edge of the region extracted in cut units.

In addition, as illustrated in FIGS. 2 and 3*b*, the original webtoon feature extraction unit 110 removes a text region and an outer region (S240).

The text region is a region with a lot of feature information, and is a region that may be easily forged. The outer region is a line region surrounding the cut, and is a region unnecessary for forgery and alteration determination.

Therefore, the original webtoon feature extraction unit 110 may efficiently determine forgery webtoon content by removing the text region and outer feature information.

Next, the original webtoon feature extraction unit 110 divides the original webtoon content region (S250).

According to an embodiment of the present invention, the original webtoon feature extraction unit 110 divides the webtoon content in the same ratio according to the preset number of regions of each cut.

For example, the user sets the cut to be divided into 16 regions in advance. In addition, when the original webtoon content is input, the original webtoon feature extraction unit 110 divides each cut into 16 regions of 4×4. At this time, the 16 divided regions have the same size.

The original webtoon feature extraction unit 110 extracts feature information for each divided original webtoon content region (S260).

Hereinafter, step S260 will be described with reference to FIGS. 4 and 5.

Figure 4:
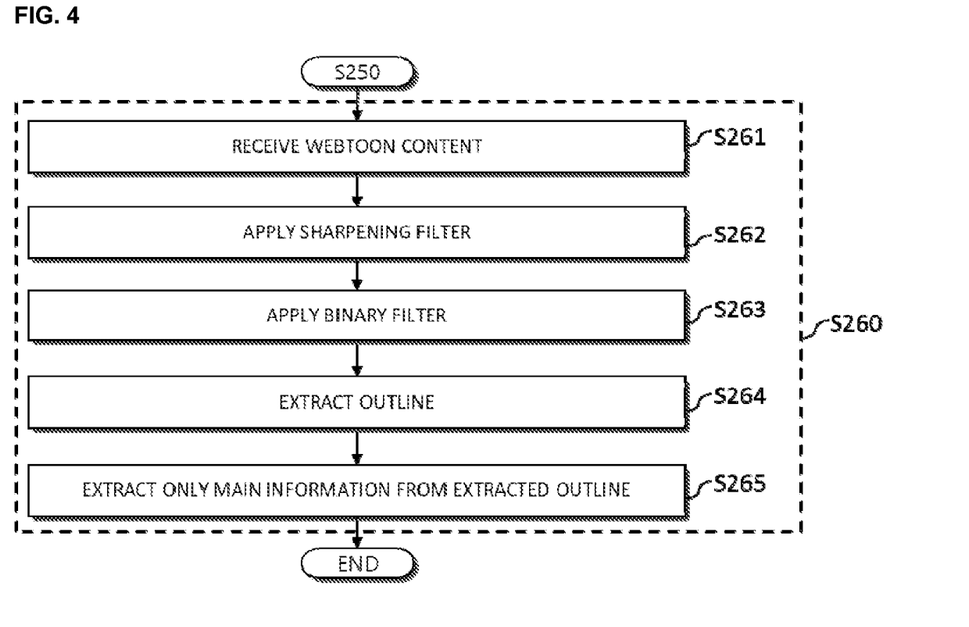
FIG. 4 is a flowchart for explaining step S260 of FIG. 2.
Figure 5:
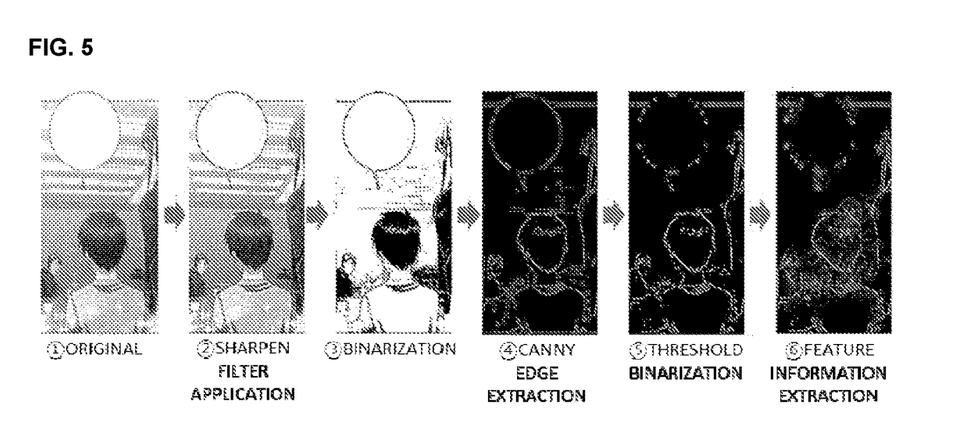
FIG. 5 is an exemplary diagram for explaining a method for extracting feature information of webtoon contents.

FIG. 4 is a flowchart for explaining step S260 of FIG. 2 and FIG. 5 is an exemplary diagram for explaining FIG. 4.

As illustrated in FIGS. 4 and 5, first, the original webtoon feature extraction unit 110 receives the webtoon content (S261).

The original webtoon feature extraction unit 110 receives input of webtoon content of which the regions are divided.

In addition, the original webtoon feature extraction unit 110 applies a sharpening filter to the webtoon content (S262).

The original webtoon feature extraction unit 110 emphasizes the outline by applying the sharpening filter.

In addition, the original webtoon feature extraction unit 110 extracts outline information by applying a binary filter to the webtoon content (S263).

The webtoon content to which the binary filter is applied is expressed in black or white.

In addition, the original webtoon feature extraction unit 110 extracts the outline from the webtoon content (S264).

At this time, the original webtoon feature extraction unit 110 extracts the outline using a Canny Edge Detector.

Here, the Canny Edge Detector may minimize the probability of not detecting the outline or detecting a region other than the outline, and effectively detect the outline by representing one edge as a single dot.

In addition, the original webtoon feature extraction unit 110 extracts only main information from the extracted outline of the webtoon content (S265).

The original webtoon feature extraction unit 110 applies threshold binarization to extract only main information from the extracted outline.

The threshold binarization is a technology that outputs black or white based on a value of a specific pixel, and may remove noise and emphasize the outline in the image.

Meanwhile, the original webtoon feature extraction unit 110 may improve a feature information extraction speed by applying a Speeded-Up Robust Feature (SURF) algorithm in step S265.

That is, the SURF algorithm may increase the feature information extraction speed by finding extreme points while increasing the scale of the filter using a box filter and an integral image. Also, since the SURF algorithm finds singularities and compares the magnitude and direction of the singularities, it is immune to changes. Also, image matching is possible even if the sizes of the images are different.

That is, according to an embodiment of the present invention, the feature information of the webtoon content may be extracted quickly without being affected by the size of the image using the SURF algorithm.

Hereinafter, a method for extracting feature information of the query target webtoon content will be described with reference to FIGS. 6 and 7.

Figure 6:
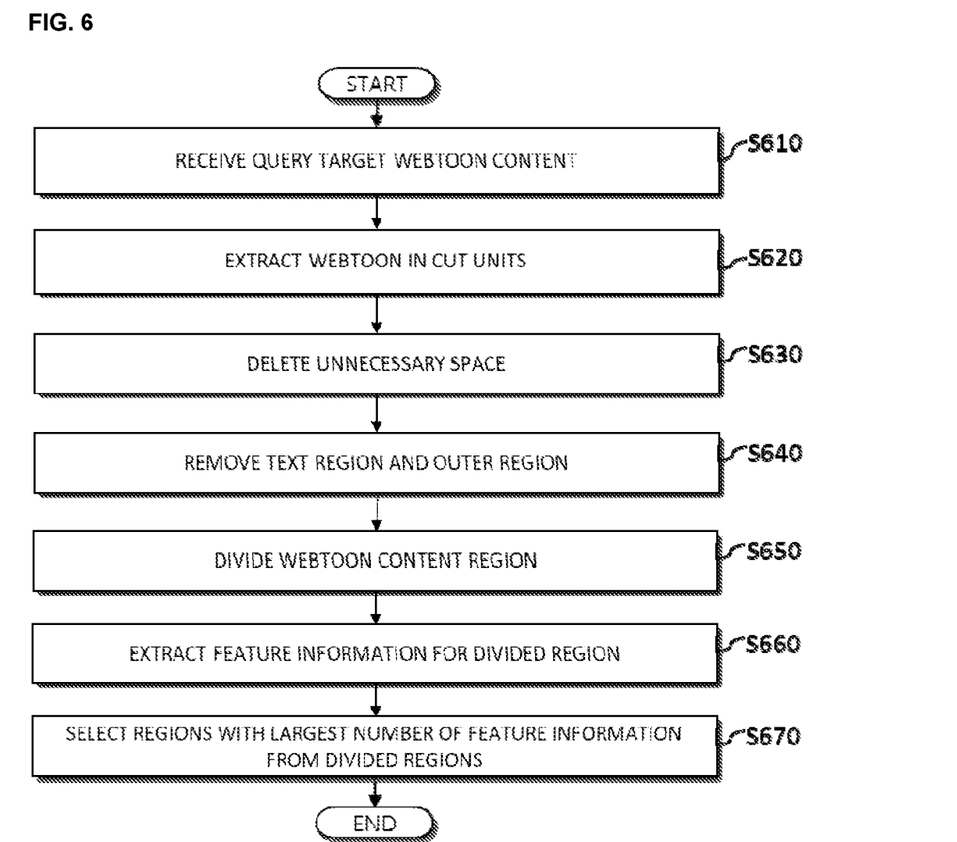
FIG. 6 is a flowchart for explaining a method for extracting feature information of webtoon contents according to an embodiment of the present invention.
Figure 7:
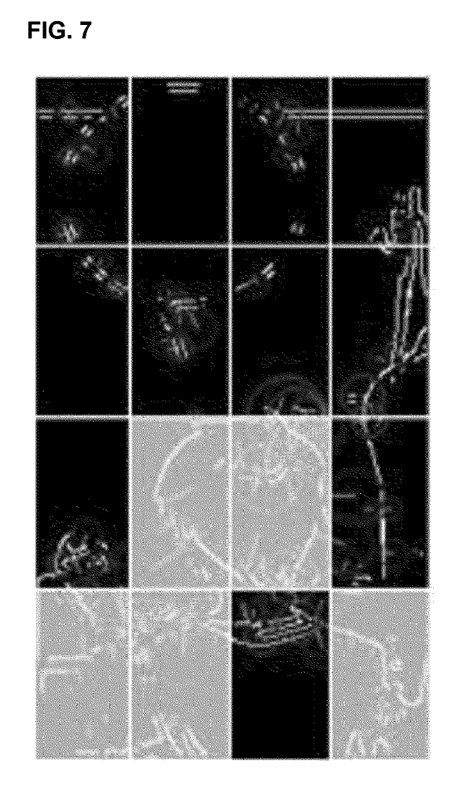
FIG. 7 is an exemplary diagram for explaining selection of a region from a region from which feature information is extracted.

FIG. 6 is a flowchart for explaining the method for extracting feature information of webtoons content content according to an embodiment of the present invention, and FIG. 7 is an exemplary diagram for explaining step S670 of FIG. 6.

First, as illustrated in FIG. 6, the query target webtoon feature extraction unit 120 receives the query target webtoon content from the user (S610).

In addition, the query target webtoon feature extraction unit 120 extracts the query target webtoon content in cut units (S620).

The query target webtoon feature extraction unit 120 extracts the query target webtoon content in cut units regardless of the size of the cut.

Next, the query target webtoon feature extraction unit 120 extracts and deletes an unnecessary space (S630).

In this case, the unnecessary space means a margin at the edge of the region extracted in cut units.

In addition, the query target webtoon feature extraction unit 120 removes the text region and the outer region of the webtoon content extracted in cut units (S640).

Therefore, the query target webtoon feature extraction unit 120 may efficiently determine forgery webtoon content by removing the text region and the outer region.

In addition, as illustrated in FIG. 6, the query target webtoon feature extraction unit 120 divides the query target webtoon content region (S650).

According to an embodiment of the present invention, the query target webtoon feature extraction unit 120 divides the query target webtoon content in the same method as the step of dividing the original webtoon content region (S250) of the original webtoon feature extraction unit 110.

Next, since step S660 of FIG. 6 is substantially the same configuration as step S260 of FIG. 2 except that the original webtoon content is changed to the query target webtoon content.

As illustrated in FIGS. 6 and 7, the query target webtoon feature extraction unit 120 selects 5 regions with the largest number of feature information from the divided regions (S670).

The query target webtoon feature extraction unit 120 selects a region with a lot of feature information and excludes a background region or a region without an outline to perform forgery and alteration determination.

That is, since the apparatus 100 for judging forgery webtoon contents determines the similarity only for the top five regions with a lot of feature information, not all regions of the query target webtoon content, it is possible to efficiently determine forgery the webtoon content.

Next, a method for judging forgery the query target webtoon content according to an embodiment of the present invention will be described with reference to FIG. 8.

Figure 8:
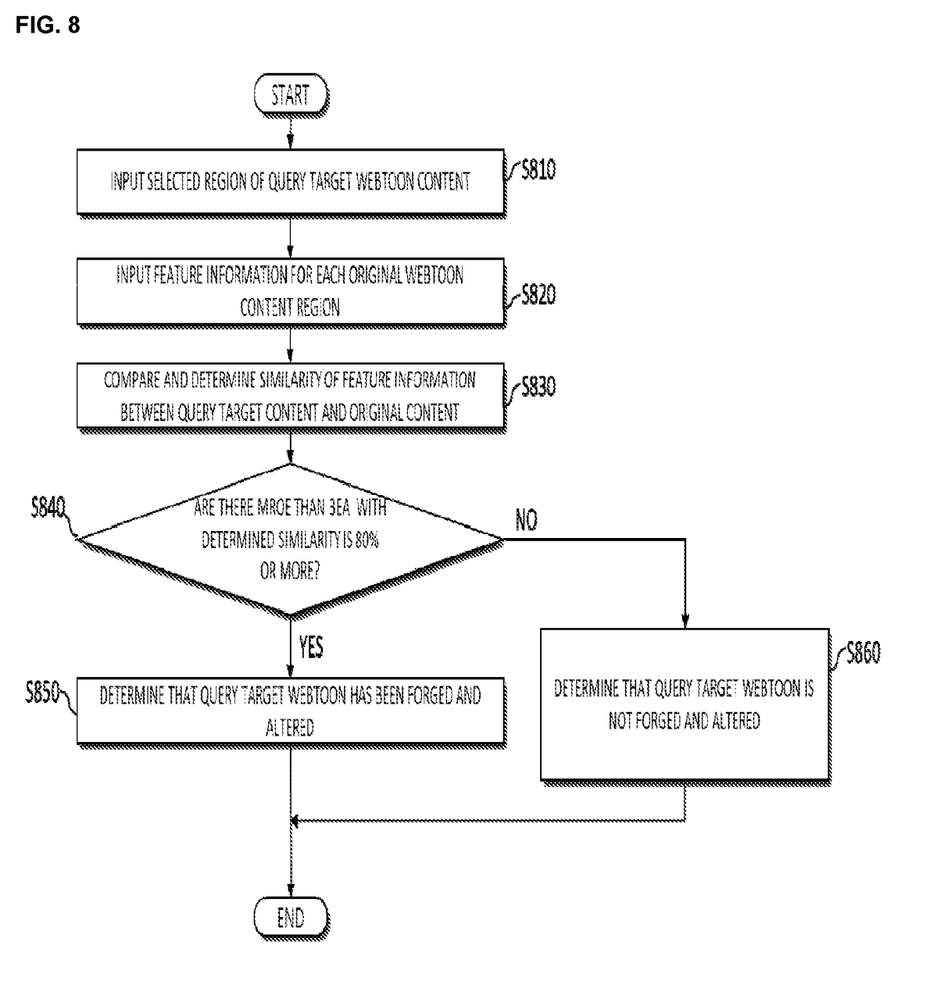
FIG. 8 is a flowchart for explaining a method for determining the query target webtoon content.

FIG. 8 is a flowchart for explaining the method for determining the forgery the query target webtoon content according to an embodiment of the present invention.

As illustrated in FIG. 8, the apparatus 100 for judging forgery webtoon contents receive input of the top 5 regions having a lot of feature information from the query target webtoon content extracted in step S670 (S810).

In addition, the apparatus 100 for judging forgery webtoon contents receives input of the feature information for each original webtoon content region extracted in step S260 (S820).

Then, the determination unit 130 compares and determines the similarity of feature information between the query target webtoon content and the original webtoon content (S830).

The apparatus 100 for judging forgery webtoon contents calculate the similarity of the feature information of the original webtoon contents region matched with the top 5 regions having a lot of feature information of the query target webtoon contents.

Alternatively, according to an embodiment of the present invention, the determination unit 130 may extract a vector using feature information of the region having a lot of feature information in the query target webtoon content and designate it as a feature vector.

Then, the determination unit 130 extracts the feature vector using feature information of the original webtoon content.

The determination unit 130 compares distributions of the feature vector of the query target webtoon content and the feature vector of the original webtoon content to calculate the similarity.

The apparatus 100 for judging forgery webtoon contents may compare feature information of the regions of the query target webtoon content and the original webtoon content through a K-Nearest Neighbors (KNN) algorithm to calculate the similarity thereof.

Next, the determination unit 130 determines that the query target webtoon content has been forged and altered if there are three or more regions having the similarity of 80% or more (S850).

In addition, if the number of regions having the similarity of 80% or more is less than 3, the determination unit 130 determines that the query target webtoon content is not forged and altered (S860).

That is, the determination unit 130 calculates the similarity using the 5 regions having the most feature information of the query target webtoon content and the original webtoon contents. Then, the determination unit 130 determines whether the query target webtoon content is forged and altered using the presence or absence of three or more regions having the similarity exceeding 80%.

As described above, according to the present invention, it is possible to determine whether the webtoon contents are forged and altered by using the feature information of the webtoon contents using deep learning to improve the identification speed.

In addition, even in the case of forgery webtoon contents in which the size or resolution of the screen is modified, there is an effect of accurately and quickly determining whether the webtoon contents are forged and altered.

Although the present invention has been described with reference to the embodiments illustrated in the drawings, this is only exemplary, and those skilled in the art will understand that various modifications and equivalent other embodiments are possible therefrom. Therefore, the true technical scope of protection of the present invention should be determined by the technical spirit of the appended claims.

The invention claimed is:

1. An apparatus for judging forgery webtoon contents, the apparatus comprising:
    an original webtoon feature extraction unit configured to:
        extract a plurality of first cuts from an original content;
        divide each of the first cuts into a plurality of first regions; and
        extract feature information for each of the first regions;
    a target webtoon feature extraction unit configured to:
        extract a plurality of second cuts from a target content;
        divide each of the second cuts into a plurality of second regions;
        extract feature information for each of the second regions; and
        select a predetermined number of the second regions based on the extracted feature information of the second regions; and
    a determination unit configured to compare the feature information of the first regions that match the selected second regions with the feature information of the selected second regions to determine a similarity, and determine whether the target content is forged and altered using a determination result,
    wherein the original webtoon feature extraction unit is further configured to remove unnecessary spaces and text regions in each of the first cuts, and the target webtoon feature extraction unit is further configured to remove unnecessary spaces and text regions in each of the second cuts, and
    wherein the unnecessary spaces include a margin around an edge of each of the first and second cuts and a frame area surrounding each of the first and second cuts, and the text regions include text inside speech ballons in each of the first and second cuts.

2. The apparatus for judging forgery webtoon contents of claim 1, wherein the original webtoon feature extraction unit or the target webtoon feature extraction unit is configured to:
    cause an outline for each of the first or second cuts from which the unnecessary spaces and the text regions are removed to be sharpened by using a sharpening filter;
    apply a binary filter to extract outline information;
    extract the outline using a Canny Edge Detector; and
    apply Threshold Binarization to extract feature information from the outline, and additionally apply a Speed Up Robust Feature (SURF) algorithm to extract the feature information of each of the first or second regions at a high speed.

3. The apparatus for judging forgery webtoon contents of claim 1, wherein the target webtoon feature extraction unit configured to select five second regions having the largest number of feature information among the plurality of second regions.

4. The apparatus for judging forgery webtoon contents of claim 3, wherein the determination unit configured to determine that the target content is forged and altered when there are three or more second regions having a similarity of 80% or more to the corresponding first regions among the selected five second regions.

5. A method for judging forgery webtoon contents by using an apparatus for judging forgery webtoon contents, the method comprising:
    extracting feature information of an original webtoon, the extracting of the feature information of the original webtoon includes:
        extracting a plurality of first cuts from an original content;
        dividing each of the first cuts into a plurality of first regions; and
        extracting feature information for each of the first regions;
    extracting feature information of a target webtoon, the extracting of the feature information of the target webtoon includes:
        extracting a plurality of second cuts from a target content;
        dividing each of the second cuts into a plurality of second regions;
        extracting feature information for each of the second regions; and
        selecting a predetermined number of the second regions based on the extracted feature information of the second regions; and
    determining forgery of the target content using the feature information of the first and second regions, the determining of the forgery of the target content includes comparing the feature information of the first regions that match the selected second region with the feature information of the selected regions to determine a similarity, and determining whether the target content is forged and altered using a determination result,
    wherein the extracting of the feature information of the original webtoon further includes removing unnecessary spaces and text regions in each of the first cuts, and the extracting of the feature information of the target webtoon further includes removing unnecessary spaces and text regions in each of the second cuts, and
    wherein the unnecessary spaces include a margin around an edge of each of the first and second cuts and a frame area surrounding each of the first and second cuts, and the text regions include text inside speech ballons in each of the first and second cuts.

6. The method for judging forgery webtoon contents of claim 5, wherein the of extracting of the feature information of the original webtoon or the target webtoon includes:
sharpening an outline for each of the first or second cuts from which the unnecessary spaces and the text regions are removed by using a sharpening filter;
applying a binary filter to extract outline information;
extracting the outline using a Canny Edge Detector;
applying Threshold Binarization to extract feature information from the outline; and
additionally applying a Speed Up Robust Feature (SURF) algorithm to extract the feature information of each of the first or second regions at a high speed.

7. The method for judging forgery webtoon contents of claim 5, wherein the selecting of the predetermined number of the second regions includes selecting five second regions having the largest number of feature information among the plurality of second regions.

8. The method for judging forgery webtoon contents of claim 7, wherein the determining of the forgery of the target content includes determining that the target content is forged and altered when there are three or more second regions having a similarity of 80% or more to the corresponding first regions among the selected five second reason.

\* \* \* \* \*